(12) United States Patent  
Sato et al.

(10) Patent No.: US 12,236,532 B2  
(45) Date of Patent: Feb. 25, 2025

(54) CONTROL FOR USING INFORMATION PROCESSING APPARATUS IN VIRTUAL SPACE

(71) Applicant: RAKUTEN GROUP, INC., Tokyo (JP)

(72) Inventors: Hitomi Sato, Tokyo (JP); Takashi Katagiri, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/921,434

(22) PCT Filed: Jul. 28, 2022

(86) PCT No.: PCT/JP2022/029100  
§ 371 (c)(1),  
(2) Date: Oct. 26, 2022

(87) PCT Pub. No.: WO2024/024019  
PCT Pub. Date: Feb. 1, 2024

(65) Prior Publication Data  
US 2024/0355056 A1  Oct. 24, 2024

(51) Int. Cl.  
*G06T 19/00* (2011.01)  
*G06F 9/455* (2018.01)  
*G06F 3/01* (2006.01)

(52) U.S. Cl.  
CPC .......... *G06T 19/00* (2013.01); *G06F 9/45558* (2013.01); *G06F 3/012* (2013.01); *G06F 2009/45579* (2013.01); *G06T 2200/24* (2013.01)

(58) Field of Classification Search  
None  
See application file for complete search history.

(56) References Cited

U.S. PATENT DOCUMENTS

2015/0309705 A1  10/2015  Keeler et al.  
2019/0012730 A1  1/2019  Keeler et al.  
(Continued)

FOREIGN PATENT DOCUMENTS

JP  2021-131661 A  9/2021  
JP  2022-036691 A  3/2022

*Primary Examiner* — Robert J Craddock  
(74) *Attorney, Agent, or Firm* — Sughrue Mion, PLLC

(57) ABSTRACT

A virtual space system according to one aspect of the present disclosure includes one or more processors, and at least one of the one or more processors executes first detection processing, first display processing, second detection processing, acquisition processing, and second display processing. The first detection processing is processing for detecting a communication apparatus object selected from a plurality of communication apparatus objects in the virtual space. The first display processing is a process of displaying, in a predetermined display area, a display screen of a communication apparatus of the same model as that represented by the selected communication apparatus object, the communication apparatus being realized by a virtual machine. The second detection processing is processing for detecting an operation on the display screen of the display area. The acquisition processing is processing for acquiring a display screen, which is to be displayed according to the operation, of the communication apparatus realized by the virtual machine, by inputting information indicating the operation into the virtual machine. The second display processing is processing for displaying the display screen to be displayed according to the operation in the display area.

14 Claims, 13 Drawing Sheets

(56) References Cited

U.S. PATENT DOCUMENTS

| | | |
|---|---|---|
| 2019/0043118 A1 | 2/2019 | Keeler et al. |
| 2019/0066198 A1 | 2/2019 | Keeler et al. |
| 2019/0266663 A1 | 8/2019 | Keeler et al. |

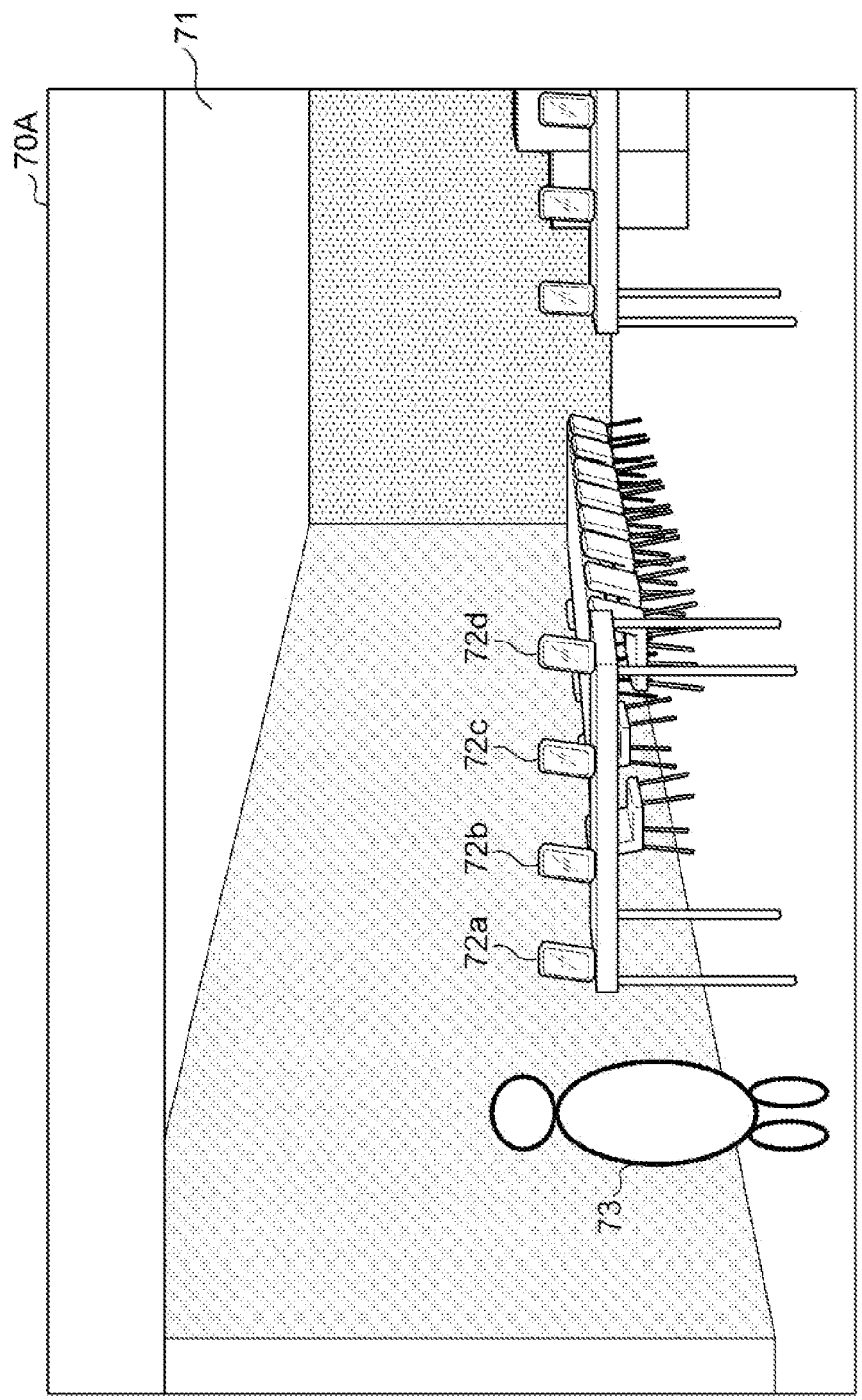

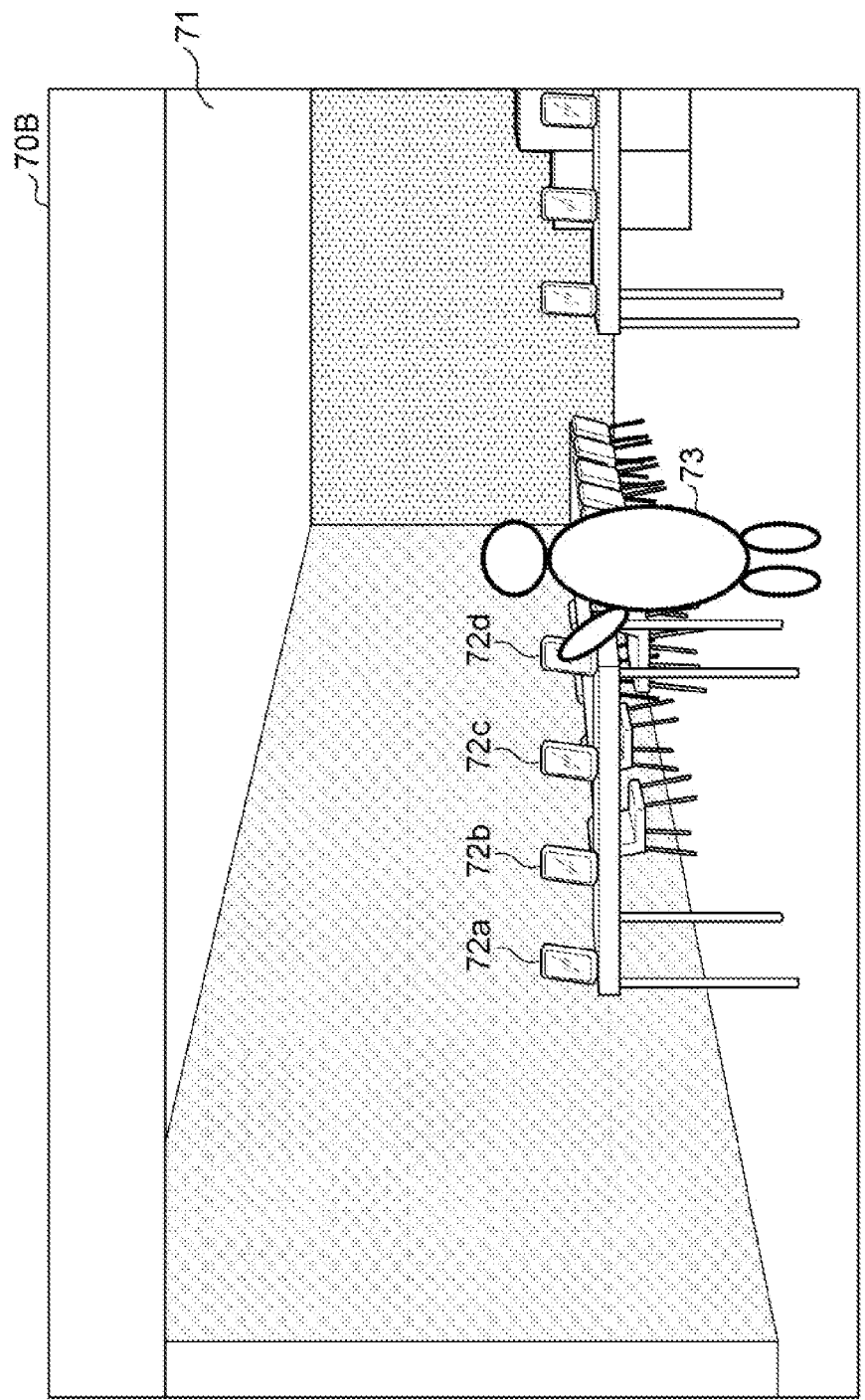

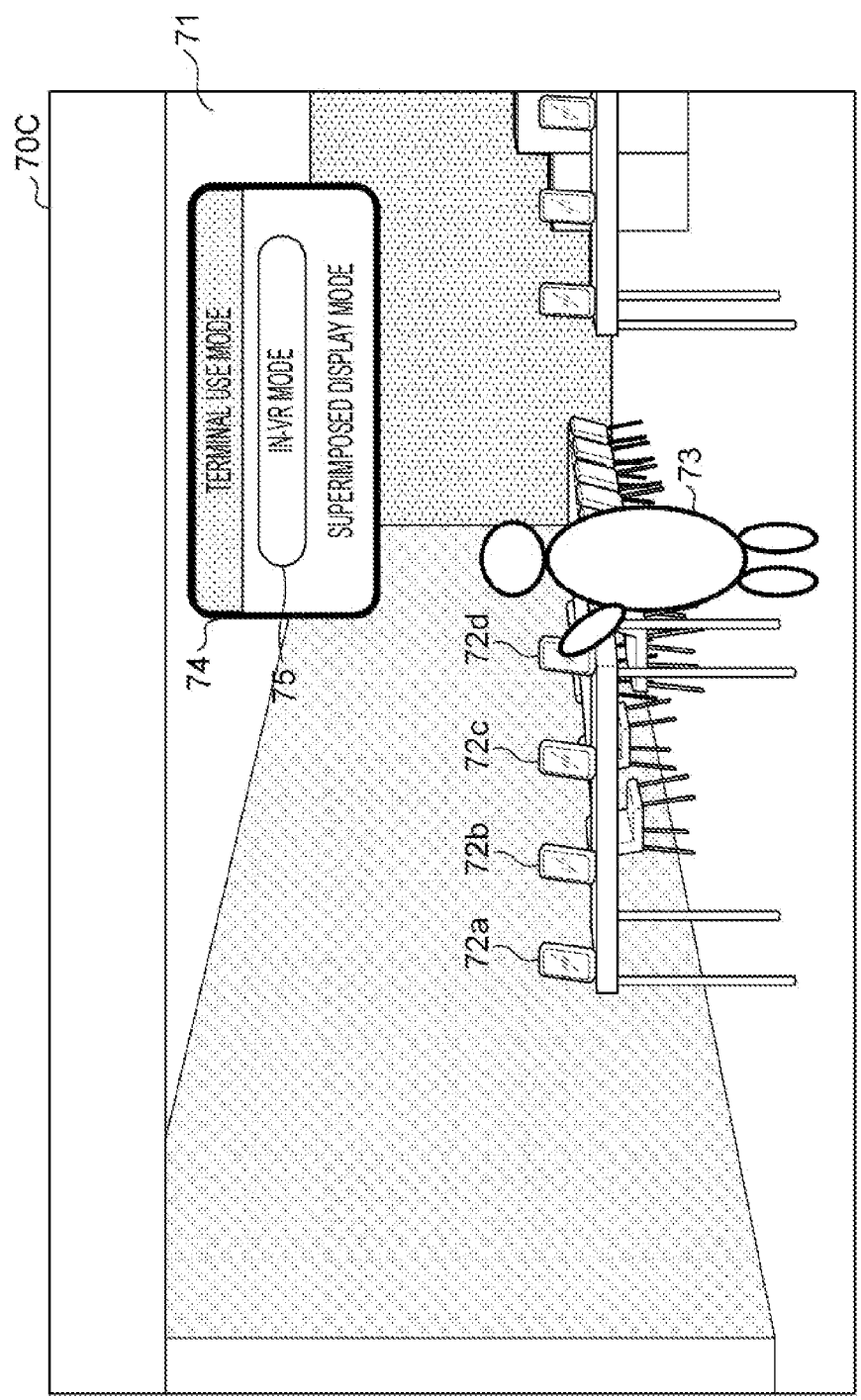

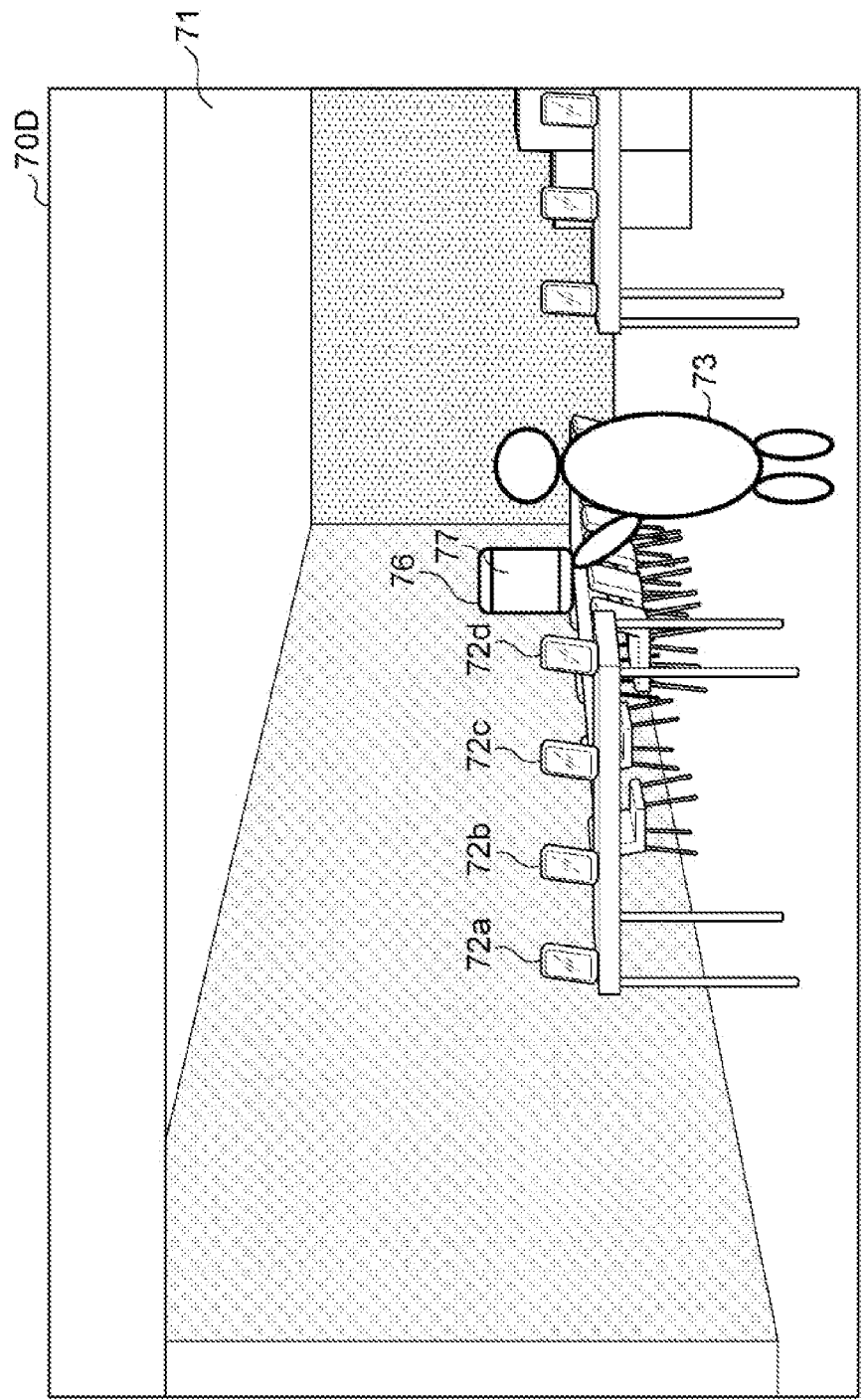

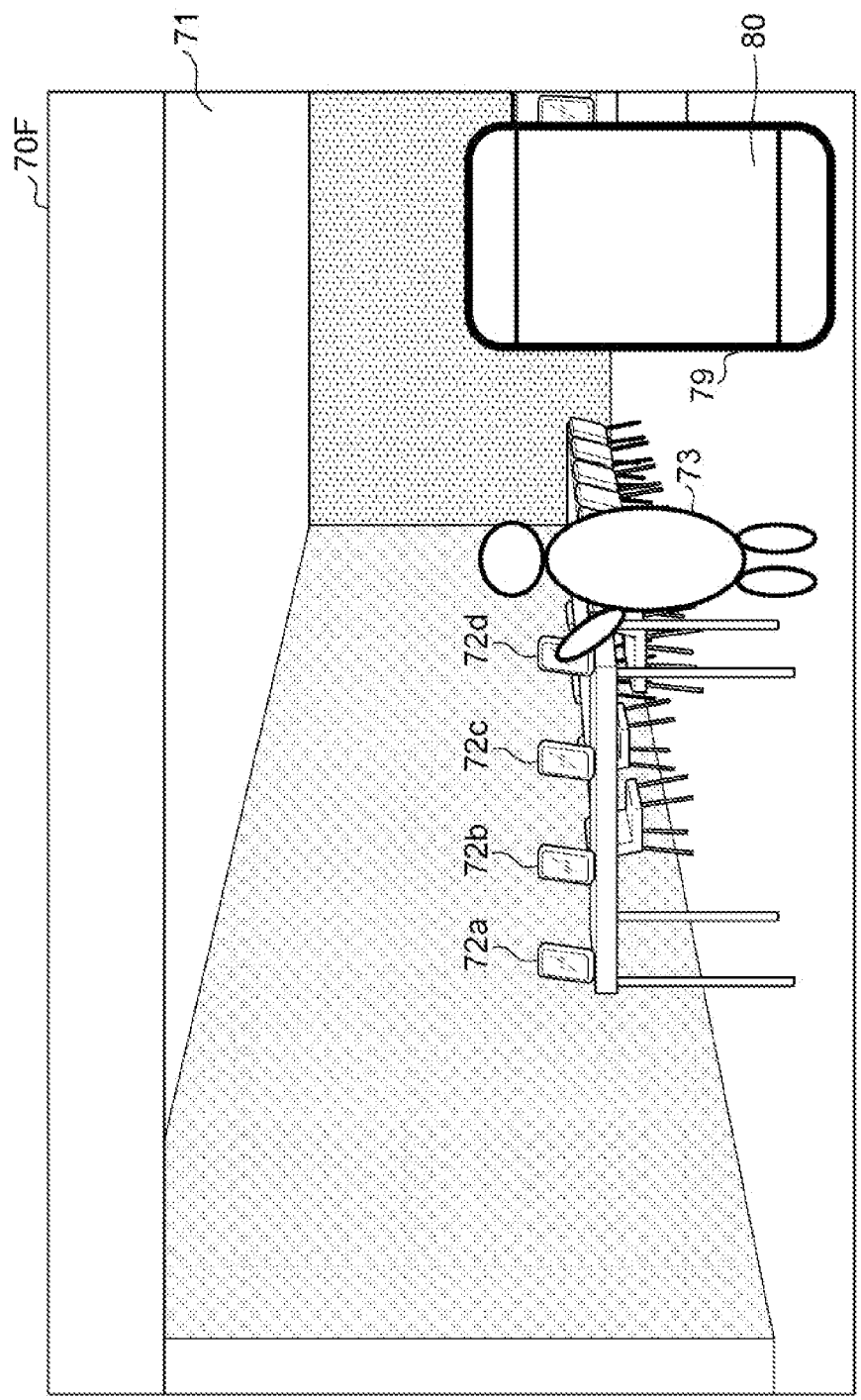

CONTROL FOR USING INFORMATION PROCESSING APPARATUS IN VIRTUAL SPACE

CROSS REFERENCE TO RELATED APPLICATIONS

This application is a National Stage of International Application No. PCT/JP2022/029100 dated Jul. 28, 2022.

TECHNICAL FIELD

The present disclosure relates to a technique for using an information processing apparatus provided in a virtual shop expressed in a virtual space.

BACKGROUND ART

In recent years, many techniques have been developed for a user to use a virtual shop expressed (deployed) in a virtual space (virtual reality space). For example, Patent Literature Document 1 discloses a technique for displaying, on a second terminal device, details of a predetermined product in a virtual shop displayed on a first terminal device, in response to a user performing a selection operation of the predetermined product. Also, Patent Literature Document 2 discloses a technique for changing (customizing) the specifications of a product selected by a user in a virtual shop and paying for the product after the specification change.

LISTING OF REFERENCES

Patent Literature Documents

Patent Literature Document 1: JP 2021-131661A
Patent Literature Document 2: JP 2022-36691A

SUMMARY OF THE INVENTION

Problems to be Solved by the Invention

A virtual shop such as that described in the above documents can sell products in real space. Accordingly, the user can purchase a product in real space while staying in the virtual space. On the other hand, depending on the product, the user may want to check how it feels to use the product. For example, in a virtual shop that deals with communication apparatuses that can be used in real space, a user may want to check the usability and convenience of operating the communication apparatus. However, until now, no mechanism has been provided for using a communication apparatus that can be used in real space, in the virtual space.

In view of such problems, an object of the present disclosure is to provide a mechanism for using an information processing apparatus that can be used in real space, in a virtual space.

Solution to the Problems

In order to solve the above-described problems, a virtual space system according to one aspect of the present disclosure includes one or more processors, and at least one of the one or more processors executes first detection processing, first display processing, second detection processing, acquisition processing, and second display processing. The first detection processing is processing for detecting a communication apparatus object selected from a plurality of communication apparatus objects in a virtual space. The first display processing is processing for displaying, in a predetermined display area, a display screen of a communication apparatus of the same model as that represented by the selected communication apparatus object, the communication apparatus being realized by a virtual machine. The second detection processing is processing for detecting an operation on the display screen in the display area. The acquisition processing is processing for acquiring a display screen, which is to be displayed according to the operation, of the communication apparatus realized by the virtual machine, by inputting information indicating the operation into the virtual machine. The second display processing is processing for displaying the display screen to be displayed according to the operation in the display area.

In order to solve the above problems, a virtual space control method according to one aspect of the present disclosure includes a first detection step, a first display step, a second detection step, an acquisition step, and a second display step. In the first detection step, a communication apparatus object selected from a plurality of communication apparatus objects in the virtual space is detected. In the first display step, a display screen of a communication apparatus of the same model as that represented by the selected communication apparatus object is displayed in a predetermined display area, the communication apparatus being realized by a virtual machine. In the second detection step, an operation on the display screen in the display area is detected. In the acquisition step, a display screen, which is to be displayed according to the operation, of the communication apparatus realized by the virtual machine is acquired by inputting information indicating the operation to the virtual machine. In the second display step, the display screen to be displayed according to the operation is displayed in the display area.

Advantageous Effects of the Invention

According to the technique of the present disclosure, a user can use an information processing apparatus that can be used in the real space, in the virtual space.

BRIEF DESCRIPTION OF THE DRAWINGS

FIG. 7A shows an example of a VR image displayed on the HMD.

FIG. 7B shows an example of a VR image for selecting a user terminal to use in a virtual space.

FIG. 7C shows an example of a VR image for selecting a terminal use mode.

FIG. 7D shows an example of a VR image in which a user terminal dedicated to an avatar operated by a user is displayed.

FIG. 7F shows an example of a VR image in which a user-dedicated user terminal is displayed in a superimposed manner.

DESCRIPTION OF EMBODIMENTS

Figure 1:
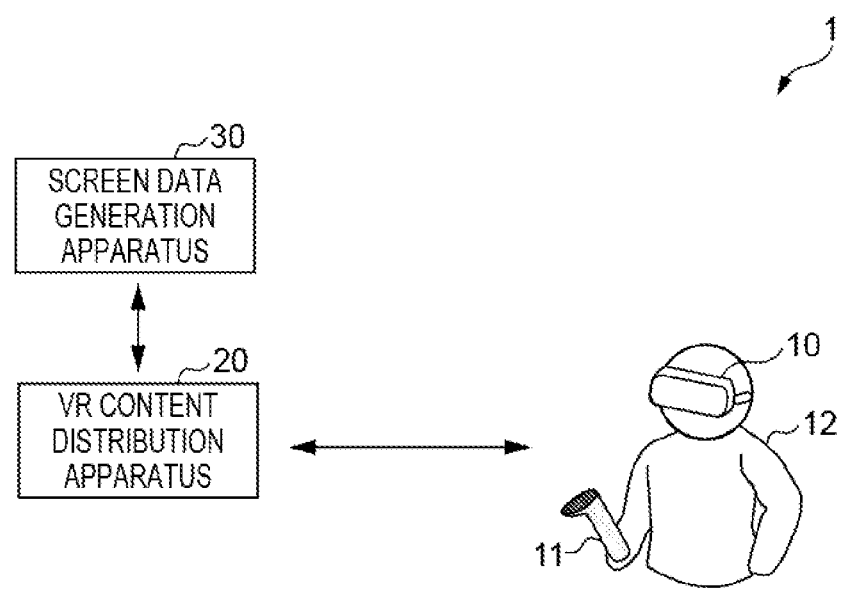
FIG. 1 shows a configuration example of a virtual space system according to an embodiment of the present disclosure.

Hereinafter, embodiments of the present disclosure will be described in detail with reference to the accompanying drawings. Among the constituent elements disclosed below, those having the same functions are denoted by the same reference numerals, and descriptions thereof are omitted. Note that the embodiment disclosed below is one mode of the present disclosure, should be modified or changed as appropriate according to the configuration of the apparatus and various conditions, and is not limited to only the following embodiment. Moreover, not all combinations of features described in the present embodiment are essential for solving the above problems.

In this embodiment, an example of using a virtual reality (VR) space or a metaverse, which is a mechanism thereof, in which a real user (human) acts as an alter ego called an avatar on the Internet, will be described. In the following description, the term "virtual reality space" (or "virtual space") means a virtual space, such as a metaverse, in which a user can act as an alter ego of the user.

Configuration of Virtual Space System

FIG. 1 shows a configuration example of a virtual space system 1 according to this embodiment. The virtual space system 1 is constituted by a head-mounted display (HMD) 10, a VR content distribution apparatus 20, and a screen data generation apparatus 30. The HMD 10 is a device that can be worn on the head of the user (player) 12. The HMD 10 outputs VR content that constitutes a virtual space distributed by the VR content distribution apparatus 20, and the user 12 can view the VR content. VR content includes at least a VR image (image data constituting a virtual space), and may also include metadata and audio indicating information about objects in the virtual space. Note that in this embodiment, the term "image" is understood to include still images and/or moving images. The user 12 can enjoy the virtual space by viewing the VR content. A virtual reality (VR) system is constituted by the VR content distribution apparatus 20 and the screen data generation apparatus 30.

The HMD 10 may be of a binocular type or a monocular type. Also, the HMD 10 may be of a non-transmissive type that completely covers the eyes of the user 12, or may be of a transmissive type. The non-transmissive type may provide a more immersive experience. Also, the HMD 10 may be a goggle-type, eyeglass-type, or hat-type of device.

By holding the controller 11 and performing an input operation, the user 12 can perform various controls and settings such as control of the avatar corresponding to the user 12. For example, the user 12 can perform a desired input operation by tilting the controller 11 or pressing a button (not shown) provided on the controller 11. Note that although FIG. 1 shows an example in which the controller 11 is composed of one piece of hardware, the controller 11 may be composed of two controllers, one for the right hand and the other for the left hand. Also, the controller 11 is not limited to a form held by the user 12, and may be in any form as long as the input operation by the user 12 is possible.

The VR content distribution apparatus 20 is a device that configures the VR system, and specifically, provides the user 12 with VR content (that is, virtual space) by distributing the VR content to the HMD 10. As will be described later, the VR content distribution apparatus 20 has a content database. The content database includes image data (VR images) representing a virtual space, model data of an avatar that is the alter ego of the user 12, voice data, and the like. The VR content distribution apparatus 20 uses the data stored in the content database to generate a VR image corresponding to the movement of the HMD 10 and the operation of the controller 11, and transmits (distributes) the VR image to the HMD 10. In addition to the VR image, audio may be transmitted to the HMD 10 according to the motion of the HMD 10 or the operation performed using the controller 11. The behavior of the avatar can be controlled by the user 12 operating the controller 11. Note that the behavior of the avatar may also be controlled through the movement of the HMD 10.

The virtual space system 1 according to the present embodiment enables the user 12 to virtually use a communication apparatus that can be used in real space at a virtual shop represented (deployed) in the virtual space provided by the VR content distribution apparatus 20. That is, the virtual space system 1 is configured such that the user 12 can, in a simulated manner, check how it feels to use a communication apparatus that can be used in real space, in the virtual space via the HMD 10.

A configuration example of a virtual space system that realizes such processing, a configuration example of each device (system) that configures the virtual space system, and an example of a specific processing procedure will be described below. In this embodiment, an object in the shape of a communication apparatus is expressed in the virtual shop. For convenience of description, the object in the virtual space or virtual shop is also simply referred to as a communication apparatus or a user terminal. Also, an example will be described in which a user 12 selects one communication apparatus from a plurality of communication apparatuses placed in the virtual space and uses the selected communication apparatus virtually (in a simulated manner). Note that in the following description, an example will be described in which the object to be used virtually by the user 12 is a user terminal such as a smartphone, but the object may be another communication apparatus or an information processing apparatus without a communication function. In other words, an information processing apparatus having a communication function called a communication apparatus may be used virtually, or an information processing apparatus without a communication function may be used virtually.

Configuration of HMD 10

Figure 2:
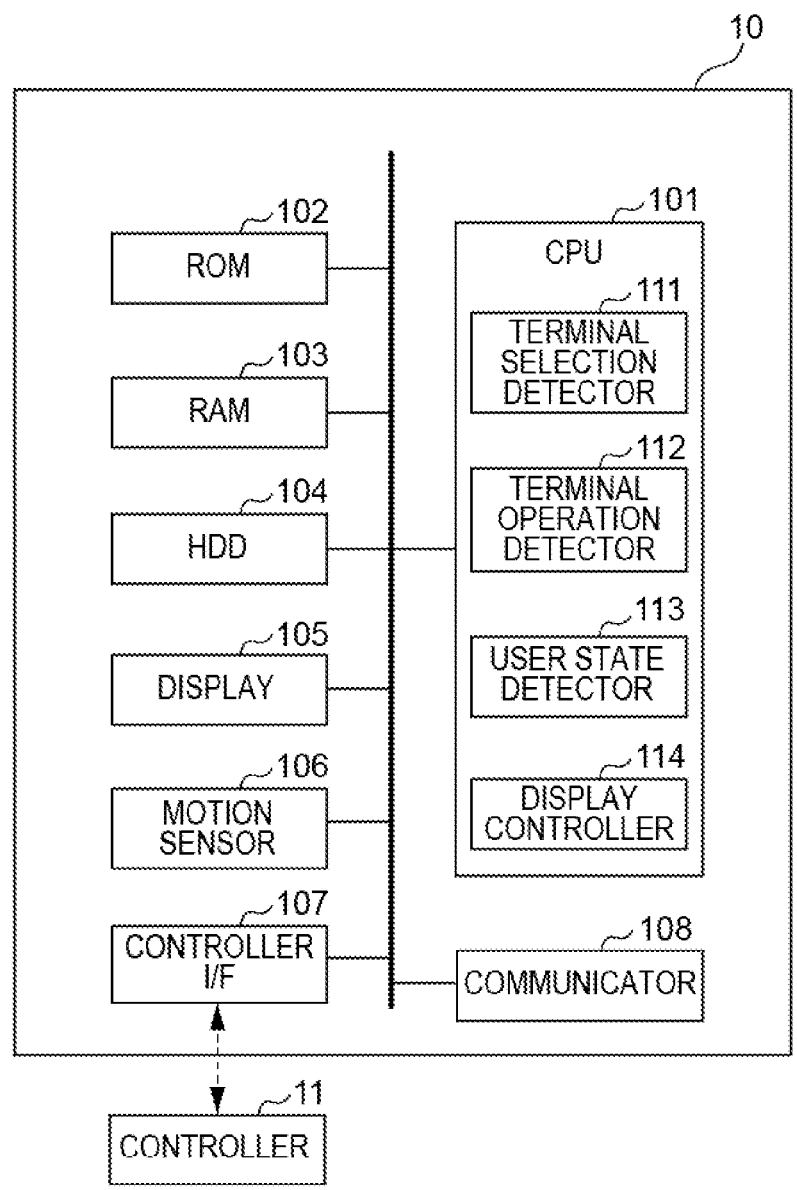
FIG. 2 shows a configuration example of a head mounted display (HMD) according to an embodiment of the present disclosure.

FIG. 2 shows a configuration example of the HMD 10 (first information processing apparatus) according to this embodiment. The HMD 10 includes a CPU 101, a ROM 102, a RAM 103, an HDD 104, a display 105, a motion sensor 106, a controller I/F (interface) 107, and a communicator 108 as a hardware configuration. The HMD 10 may also include an external memory and a line-of-sight detection sensor (a sensor that detects movement of the line of sight of the user 12). The HMD 10 also has a terminal selection detector 111, a terminal operation detector 112, a user state detector 113, and a display controller 114 as functional configurations executed by the CPU 201.

A CPU (Central Processing Unit) 101 is constituted by one or more processors and controls the operation of the HMD 10 in an integrated manner. The CPU 101 may be replaced by one or more processors such as an ASIC (Application-Specific Integrated Circuit), an FPGA (Field Programmable Gate Array), a DSP (Digital Signal Processor), or a GPU (Graphics Processing Unit). A functional configuration of the CPU 101 will be described later.

The ROM (Read Only Memory) 102 is a non-volatile memory that stores control programs and the like necessary for the CPU 101 to execute processing. Note that the program may be stored in a non-volatile memory such as the HDD (Hard Disk Drive) 104 or an SSD (Solid State Drive) or an external memory such as a removable storage medium (not shown).

The RAM (Random Access Memory) 103 is a volatile memory and functions as a main memory of the CPU 101, a work area, and the like. That is, the CPU 101 loads necessary programs and the like from the ROM 102 to the RAM 103 when executing processing, and realizes various functional operations by executing the programs and the like.

The HDD 104 stores, for example, various types of data, information, and the like necessary for the CPU 101 to perform processing using the program. Also, the HDD 104 stores various types of data, information, and the like obtained by the CPU 101 performing processing using a program or the like, for example. Note that the storage may be performed together with the HDD 104 or instead of the HDD 104 using a non-volatile memory such as an SSD or an external memory such as a removable storage medium.

The display 105 is realized by a liquid crystal display or the like. For example, the display 105 is provided with a first display (first display region) set in front of the left eye of the user 12 and a second display (second display region) set in front of the right eye, and stereoscopic display is possible. In order to enable such stereoscopic display, the display controller 114 of the CPU 101 can generate a left-eye image and a right-eye image with different parallaxes, display the left-eye image on the first display, and display the right-eye image on the second display. Note that the display 105 may be constituted by an integrated display in which the first display and the second display are integrated.

The motion sensor 106 detects information indicating the orientation of the user 12 wearing the HMD 10, such as the rotation angle and tilt of the HMD 10 (hereinafter referred to as orientation information). The motion sensor 106 can be formed by combining a gyro-sensor, an acceleration sensor, an angular acceleration sensor, and the like.

From the controller 11, the controller I/F 107 detects (receives) information indicating an operation performed by the user 12 on the controller 11 (hereinafter referred to as operation information). For example, the controller I/F 107 receives operation information via the communicator 108. The user's operation on the controller 11 includes, for example, pressing a button provided on the controller 11, the position, orientation, and inclination of the controller 11, and/or the level of force with which the controller 11 is gripped. In this embodiment, the HMD 10 is configured to receive operation information from the controller 11 and transmit the operation information to the VR content distribution apparatus 20. Note that the controller 11 may also be configured to directly transmit the operation information to the VR content distribution apparatus 20.

The communicator 108 is an interface that controls communication between the HMD 10 and an external device. For example, the communicator 108 is configured to communicate with the VR content distribution apparatus 20 and the screen data generation apparatus 30 via communication networks such as the Internet and a wireless LAN.

Next, the functional configuration of the CPU 101 of the HMD 10 will be described.

The terminal selection detector 111 detects information corresponding to terminal selection (terminal selection information) from the orientation information of the user 12 detected by the motion sensor 106 and the operation information of the user 12 detected by the controller I/F 107.

Terminal selection is an operation by which the user 12 selects one user terminal from a plurality of user terminals (communication apparatus objects) placed in the virtual shop represented in the VR image (virtual space) displayed on the display 105. Terminal selection corresponds to, for example, an operation of selecting one user terminal from a plurality of user terminals in the virtual space by the controller 11. Alternatively, predetermined movements and operations on the HMD 10 and the controller 11 may be set in advance so as to correspond to terminal selection. The terminal selection information indicates, for example, the position of the selection operation in the VR image or the virtual shop. Alternatively, the terminal selection information may be information (identification information) for identifying one user terminal selected from a plurality of user terminals.

Furthermore, the terminal selection information includes information on the use mode (terminal use mode) of the user terminal selected by the user 12 in the virtual space. The terminal use mode will be described later.

The terminal selection information is transmitted to the VR content distribution apparatus 20 via the communicator 108 or from the controller 11.

The terminal operation detector 112 detects information corresponding to the terminal operation (terminal operation information) from the orientation information of the user 12 detected by the motion sensor 106 and the operation information of the user 12 detected by the controller I/F 107.

A terminal operation is an operation performed on a user terminal selected by the user 12. For example, a terminal operation corresponds to an operation performed by the controller 11 on a predetermined area (also referred to as an operation area). The operation area may be determined in advance, or may be determined by an operation via the controller 11 or the like.

Note that in the user terminal operated in the virtual space, the area for displaying the image and the area for performing the operation do not match in some cases, as with a laptop, or the area for displaying the image and the area for performing the operation match in some cases, as with a touch panel of a smartphone. For this reason, the display area described later and the operation area described above may or may not match. Also, when the display area and the operation area match each other, they may match at least partially.

Also, predetermined movements and operations performed on the HMD 10 and the controller 11 may be set in advance so as to correspond to terminal operations. The terminal operation information can include information on the position and information on the three-dimensional angle at which the terminal operation was performed. Note that, as will be described later, the terminal operation differs depending on whether the user 12 uses a user terminal in the virtual space or a user terminal displayed superimposed on the virtual space.

The user state detector 113 generates, as user state information, information that does not correspond to the above-described terminal selection and terminal operation out of the orientation information of the user 12 detected by the motion sensor 106 and the operation information of the user 12 detected by the controller I/F 107. The user state detector 113 can transmit user state information to the VR content distribution apparatus 20 via the communicator 108. User state information can also be sent from the controller 11. In a case where the HMD 10 includes a line-of-sight detection sensor, the user state information can include information on the movement of the line of sight of the user 12.

Furthermore, in the present embodiment, the user state information also includes information indicating an end-of-use operation of the user terminal used by the user 12 in the virtual shop.

The display controller 114 performs display control on the display 105. For example, the display controller 114 performs control for displaying, on the display 105, the VR image generated by the VR content distribution apparatus 20 corresponding to the user state information generated by the user state detector 113. The display controller 114 can perform control for stereoscopic display as described above.

Also, the display controller 114 can display an image for browsing the display screen of the user terminal selected by the user 12, in a superimposed manner on the VR image. The image may be an image imitating the user terminal selected by the user 12. For example, the image may include a frame of the user terminal and a display screen inside the frame. Also, the display controller 114 can acquire the screen data generated by the screen data generation apparatus 30 via the VR content distribution apparatus 20 and display it on the display screen within the image.

Configuration of VR Content Distribution Apparatus 20

Figure 3:
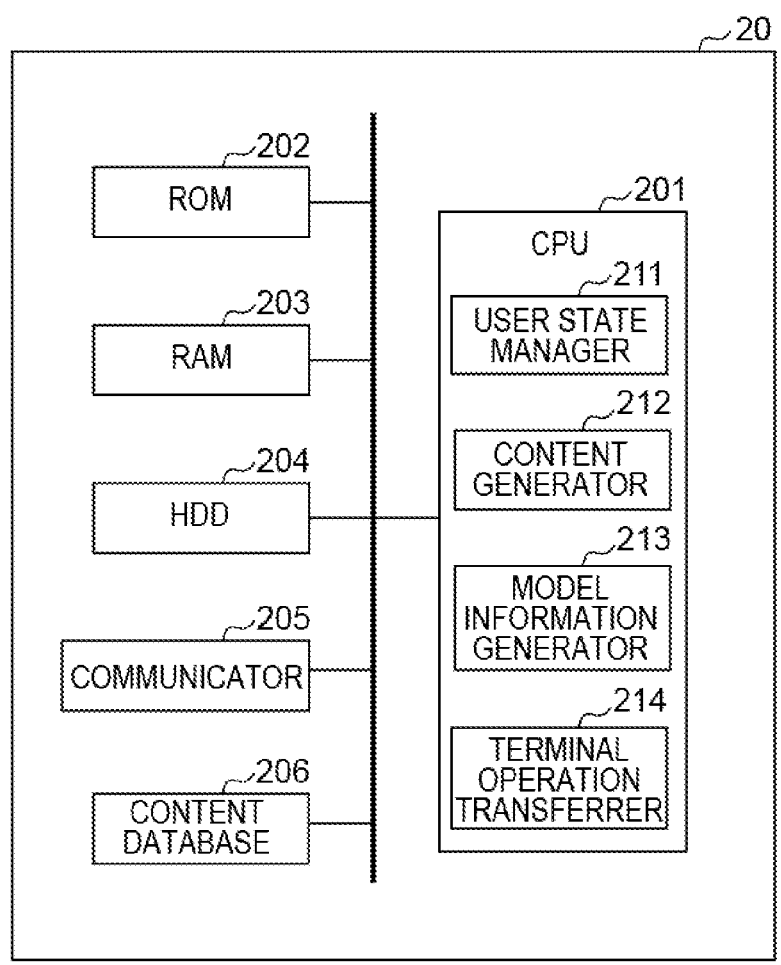
FIG. 3 shows a configuration example of a VR content distribution apparatus according to an embodiment of the present disclosure.

FIG. 3 shows a configuration example of the VR content distribution apparatus 20 (second information processing apparatus) according to this embodiment. The VR content distribution apparatus 20 distributes VR content to the HMD 10. In a case where the user 12 needs to perform predetermined login processing (including authentication processing for logging in with a non-general-purpose account) in order to use the VR content provided by the VR content distribution apparatus 20, the user 12 performs login processing, for example, using predetermined information (e.g., an ID and a password) by operating the HMD 10 or the controller 11. The login processing can be performed by the VR content distribution apparatus 20.

The VR content distribution apparatus 20 includes a CPU 201, a ROM 202, a RAM 203, an HDD 204, a communicator 205, and a content database 206 as a hardware configuration. The VR content distribution apparatus 20 also has a user state manager 211, a content generator 212, a model information generator 213, and a terminal operation transferrer 214 as functional configurations executed by the CPU 201. Since the basic configurations of the CPU 201, the ROM 202, the RAM 203, and the HDD 204 are the same as those of the CPU 101, the ROM 102, the RAM 103, and the HDD 104 in FIG. 2, description thereof will be omitted.

The communicator 205 is an interface that controls communication between the VR content distribution apparatus 20 and an external device. For example, the communicator 205 is configured to communicate with the HMD 10 and the screen data generation apparatus 30 via communication networks such as the Internet and a wireless LAN. The communicator 205 may also be configured to communicate with the controller 11.

The content database 206 is configured to store image data (VR images) forming a virtual space, model data of an avatar that is the alter ego of the user 12, voice data, and the like. Furthermore, in this embodiment, the content database 206 is configured to store information regarding multiple user terminals at the virtual shop. Specifically, each of the plurality of user terminals in the virtual shop corresponds to a user terminal that can be used in the real space, and the content database 206 stores information (model information) on the model of each user terminal in the virtual shop. The model information can include the manufacturer name, model number, and the like, and can be stored in association with information (identification information) that identifies each user terminal. Alternatively, the model information can be stored in association with the position of each user terminal disposed in the virtual shop (the position in the virtual space or in the virtual shop). Furthermore, the model information is stored in association with shape data of the user terminal of the model information (an image including the frame of the user terminal and the display screen).

Note that the content database 206 and the VR content distribution apparatus 20 may be separate devices. In this case, the VR content distribution apparatus 20 can use the data stored in the content database 206 by communicating with the content database 206.

Next, the functional configuration of the CPU 201 of the VR content distribution apparatus 20 will be described.

The user state manager 211 detects (receives) the user state information transmitted by the user state detector 113 of the HMD 10 via the communicator 205 and outputs the user state information to the content generator 212. Note that in a case where the user state information is information indicating an end-of-use operation of the user terminal in the virtual shop, the user state manager 211 transmits an end instruction to the screen data generation apparatus 30 via the communicator 205.

The content generator 212 generates VR content representing the virtual space from the data acquired from the content database 206 based on the user state information detected by the user state manager 211. VR content includes VR images to be displayed on the HMD 10 and may also include audio. The content generator 212 distributes (transmits) the generated VR content to the HMD 20 via the communicator 205.

In this embodiment, the content generator 212 generates VR content representing a virtual shop where multiple user terminals are placed. Here, each of the plurality of user terminals can have identification information.

Also, the content generator 212 can perform control for incorporating the screen data received from the screen data generation apparatus 30 via the communicator 205 into the VR image. Specifically, the content generator 212 is configured to be able to incorporate (insert) the received screen data into a display area such as a display screen of the user terminal in the virtual space. Note that the received screen data may be transferred to the HMD 10 without being incorporated into the display area.

The model information generator 213 detects (receives) the terminal selection information transmitted by the terminal selection detector 111 (or the controller 11) of the HMD 10 via the communicator 205, and identifies the user terminal according to the terminal selection information. Next, the model information generator 213 acquires model information (manufacturer name and model number) of the user terminal that was specified (i.e., selected by the user 12), from the content database 206. For example, in a case where the terminal selection information is the position of the selection operation in the virtual shop (or VR image), the model information generator 213 acquires the model information stored in the content database 206 in association with the position. Also, in a case where the terminal selection information is user identification information, the model information generator 213 acquires the model information stored in the content database 206 in association with the model information. The model information generator 213 transmits the model information to the screen data generation apparatus 30 via the communicator 205. The transmitted model information means a request by the user 12 to use the user terminal having the model information (or a request to allocate the virtual machine of the model information).

Also, the model information generator 213 can output the model information to the content generator 212. Alternatively, the model information generator 213 can acquire shape data of the user terminal stored in the content database 206 in association with the model information.

The terminal operation transferrer 214 is configured to be able to receive the terminal operation information transmitted by the terminal operation detector 112 (or the controller 11) of the HMD 10 via the communicator 205, and transfer it to the screen data generation apparatus 30.

Configuration of Screen Data Generation Apparatus 30

Figure 4:
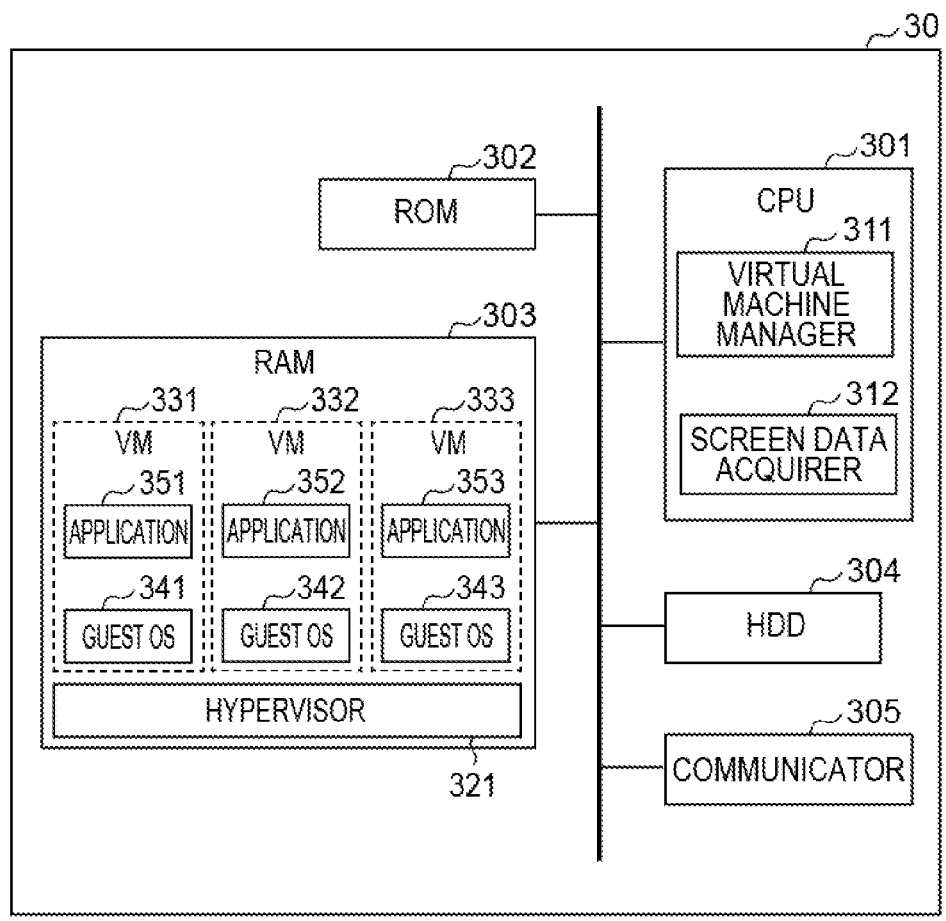
FIG. 4 shows a configuration example of a screen generation apparatus according to an embodiment of the present disclosure.

FIG. 4 shows a configuration example of the screen data generation apparatus 30 (third information processing apparatus) according to this embodiment.

The screen data generation apparatus 30 includes a CPU 301, a ROM 302, a RAM 303, an HDD 304, and a communicator 305 as a hardware configuration. The screen data generation apparatus 30 also has a virtual machine (VM) manager 311 and a screen data acquirer 312 as functional configurations executed by the CPU 301. Since the basic configurations of the CPU 301, the ROM 302, and the HDD 304 are the same as those of the CPU 101, the ROM 102, and the HDD 104 in FIG. 2, description thereof will be omitted.

The RAM 303 stores a hypervisor 321 and virtual machines (VMs) 331, 332, and 333. The virtual machine 331 includes a guest OS 341 and an application 351. The virtual machine 332 includes a guest OS 342 and an application 352. The virtual machine 333 includes a guest OS 343 and an application 353.

The hypervisor 321 is a program for building a virtual environment, and in the example of FIG. 4, the plurality of virtual machines 331, 332, and 333 constructed on the hypervisor 321 are run.

A guest OS is basic software for running various applications in a virtual machine. The guest OS 341 runs the application 351, the guest OS 342 runs the application 352, and the guest OS 343 runs the application 353.

The application 351 is a program that runs on the guest OS 341, the application 352 is a program that runs on the guest OS 342, and the application 353 is a program that runs on the guest OS 343.

Note that although FIG. 3 shows an example in which the RAM 303 has three virtual machines 331, 332, and 333, the number of virtual machines is not limited to a specific number. As will be described later, the virtual machine manager 311 can perform management of virtual machines, such as creating and deleting virtual machines.

In this embodiment, an application in each virtual machine is a program for virtually realizing a user terminal (specifically, at least some of the functions of the terminal) that can be used in real space. The application is configured to receive terminal operation information as input and output (generate) data of a screen to be displayed on the display screen of the user terminal according to the terminal operation corresponding to the information (data of a screen to be transitioned to according to the terminal operation). That is, each virtual machine functions as a virtual user terminal capable of generating screen data to be displayed according to an operation performed by the user 12. Each virtual machine (virtual user terminal) is managed so as to be identifiable by the identification information (manufacturer name and model number) of the user terminal in the real space. The virtual machines 331, 332, and 333 shown in FIG. 3 are identified by the following manufacturer names and model numbers, for example. The symbols in parentheses represent the virtual machine identification information of each virtual machine, which is obtained by integrating the manufacturer name and model number.

Virtual machine 331→Manufacturer name: Manufacturer A, Model number: a01 (Aa01)
Virtual machine 332→Manufacturer name: Manufacturer A, Model number: a02 (Aa02)
Virtual machine 333→Manufacturer name: Manufacturer B, Model number: b01 (Bb01)

The virtual machines 331, 332, and 333 shown in FIG. 3 may be created in advance or may be created by the virtual machine manager 311. As will be described later, the virtual machine manager 311 has a function of creating virtual machines.

The communicator 305 is an interface that controls communication between the screen data generation apparatus 30 and an external device. For example, the communicator 305 is configured to communicate with the VR content distribution apparatus 20 via communication networks such as the Internet and a wireless LAN.

Next, the functional configuration of the CPU 301 of the screen data generation apparatus 30 will be described.

The virtual machine manager 311 manages the virtual machines stored in the RAM 303. For example, the virtual machine manager 311 creates virtual machines. Specifically, the virtual machine manager 311 can create the virtual machine of the model information received from the VR content distribution apparatus 20 via the communicator 305 (i.e., the virtual machine that virtually realizes at least some of the functions of the user terminal of the model information in the real space). In a case where the virtual machine of the received model information has already been stored in the RAM 303, the virtual machine manager 311 may use the stored virtual machine without creating the virtual machine of the received model information. Also, the virtual machine manager 311 may be configured to create a virtual machine according to a predetermined instruction received via the communicator 305.

The virtual machine manager 311 can create multiple virtual machines with the same model information. For example, in a case where multiple users including the user 12 have selected user terminals with the same model information in the virtual space, the virtual machine manager 311 can create multiple virtual machines with the same model information. At this time, the virtual machine manager 311 can create virtual machines in which the same model information is associated with different identification numbers (e.g., identification numbers in ascending order). For example, in a case where the above-described virtual machine 331 is the second virtual machine having the same virtual machine identification information (Aa01), the virtual machine identification information of the virtual machine 331 is Aa01-02.

In this manner, the virtual machine manager 311 is configured to be able to create a virtual machine with the model information received from the VR content distribution apparatus 20 and to create a plurality of virtual machines with the same model information. Accordingly, even in a case where only a limited number of user terminals can be disposed in the virtual shop due to store design, appearance, and the like, the virtual machine manager 311 can create an appropriate number of virtual machines regardless of that number. As a result, for example, multiple users and multiple avatars corresponding to the multiple users can select and use the user terminals they want to use, regardless of the number of user terminals disposed in the virtual shop.

Also, the virtual machine manager 311 manages the statuses of the virtual machines in the RAM 303. For example, a virtual machine used by one or more users including user 12 (that is, a virtual machine being used by the screen data acquirer 312) is managed as being "in use" and a virtual machine that is not being used by one or more users including user 12 is managed as being "not in use". Also, the virtual machine manager 311 may adjust the number of created virtual machines. For example, in a case where the number of virtual machines for which the model of the communication apparatus to be realized is the same and for which the status is "not in use" is a predetermined number or less, the virtual machine manager 311 may create a virtual machine that realizes that model. As a result, even if many operation requests are made for a certain popular model, the operation requests can be answered. Also, the number of virtual machines that realize communication apparatuses of models for which operation requests are not often made may be reduced. With such status management, the virtual machine manager 311 can create new virtual machines and delete unnecessary (e.g., surplus) virtual machines, and thus the capacity of the RAM 303 can be efficiently managed.

Also, the virtual machine manager 311 allocates a virtual machine for use by the user 12 based on the model information received from the VR content distribution apparatus 20 (i.e., the model information of the user terminal selected by the user 12). Specifically, the virtual machine manager 311 allocates to the user 12 a virtual machine whose status is "not in use" and that has the model information. The virtual machine manager 311 notifies the screen data acquirer 312 of the virtual machine identification information of the allocated virtual machine.

Also, in a case where the virtual machine manager 311 receives the end-of-use instruction transmitted from the user state manager 211 of the HMD 10 via the communicator 305, the virtual machine manager 311 changes the status of the allocated virtual machine from "in use" to "not in use". For example, in a case where an end-of-use instruction is received from the HMD 10 due to an operation performed by the user 12, the virtual machine manager 311 changes the status of the virtual machine allocated to the user 123 from "in use" to "not in use". Subsequently, the virtual machine manager 311 refers to the RAM 303, and counts the number of virtual machines with the status "not in use" that realize the same model of communication apparatus as the virtual machine changed to "not in use". Then, in a case where the number of the virtual machines is less than the predetermined number, the virtual machine manager 311 can initialize the allocated virtual machine (e.g., erase it once and recreate it). On the other hand, in a case where the number of virtual machines is the predetermined number or more, the virtual machine manager 311 can delete the allocated virtual machine.

The screen data acquirer 312 acquires (receives) terminal operation information from the terminal operation transferrer 214 of the HMD 10, the controller 11, or the VR content distribution apparatus 20 via the communicator 305. The screen data acquirer 312 inputs the terminal operation information to the virtual machine having the virtual machine identification number notified from the virtual machine manager 311. As described above, the virtual machine is configured to receive terminal operation information as input and output (generate) screen data that is to be transitioned to according to the terminal operation corresponding to the information.

Note that the HMD 10, the VR content distribution apparatus 20, and the screen data generation apparatus 30 may have dedicated hardware for executing their respective functions, or may execute some of their functions by hardware and execute the rest with the computer that runs the program. Also, all functions may be performed by computers and programs.

Flow of Processing (When Using a User Terminal by Displaying an Image From the Screen Data Generation apparatus 30 on an Object in the Virtual Space)

Figure 5:
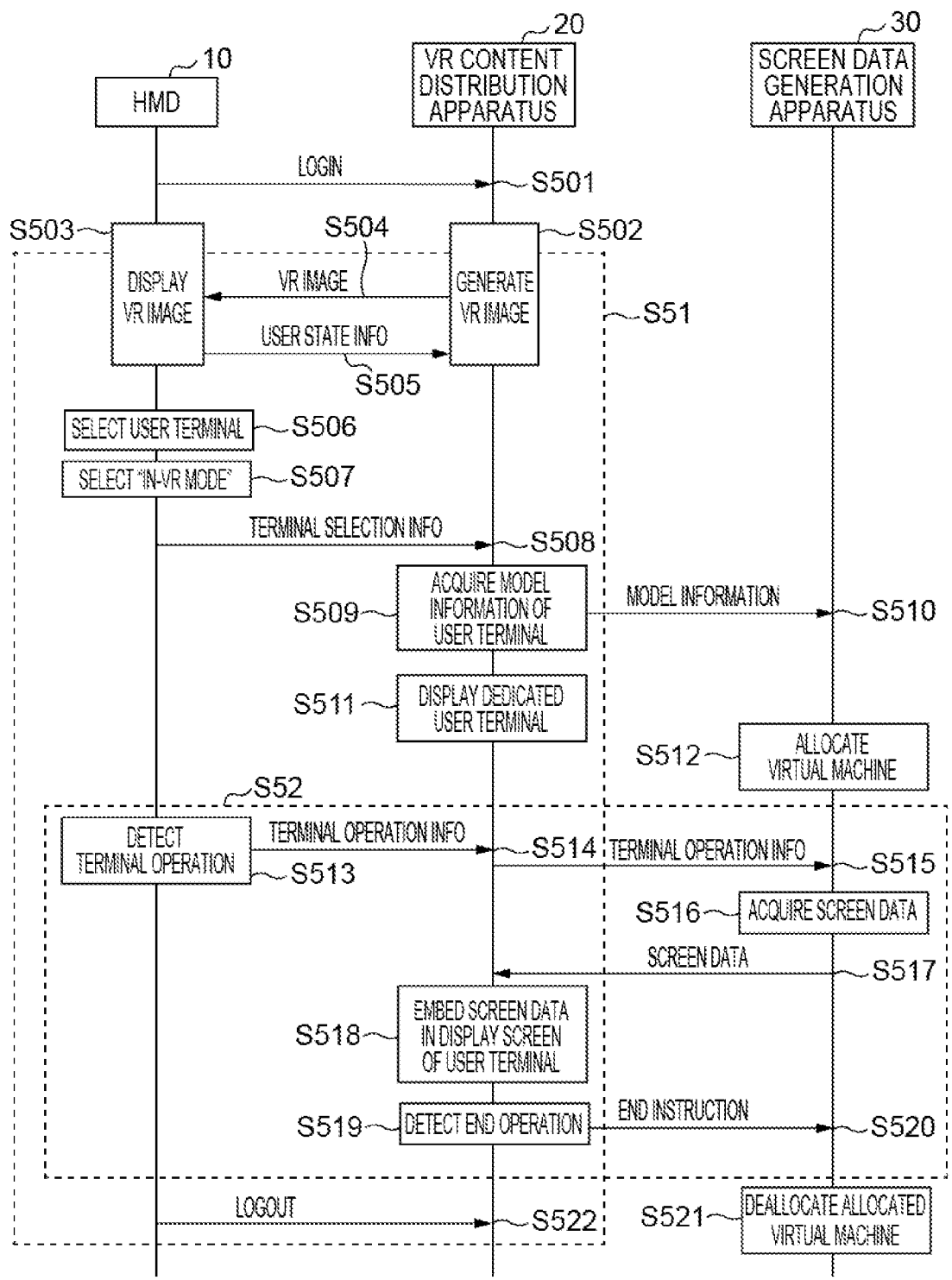
FIG. 5 shows an example of a communication sequence diagram for the HMD, the VR content distribution apparatus, and the screen generation apparatus.

The flow of processing when using a user terminal (operating a user terminal) in a virtual space according to the present embodiment will be described with reference to FIG. 5. FIG. 5 shows an example of a communication sequence diagram for the HMD 10, the VR content distribution apparatus 20, and the screen data generation apparatus 30.

In S501, the HMD 10 logs into the VR system via the VR content distribution apparatus 20 according to an operation performed by the user 12. When logging in, the user 12 can set an avatar, which is the alter ego of the user 12 to be used in the virtual space. After the HMD 10 logs in, the content generator 212 of the VR content distribution apparatus 20 generates VR content including a VR image (S502), and provides the VR content to the HMD 10 via the communicator 205 (S504). The display controller 114 of the HMD 10 displays the VR image received via the communicator 108 on the display 105 (S503).

In this embodiment, in the VR image, a virtual shop where a plurality of user terminals are placed is expressed. An example of a VR image is shown in FIG. 7A. In a VR image 70A in FIG. 7A, a plurality of user terminals including user terminals 72a, 72b, 72c, and 72d are placed in a virtual shop 71. The user terminals 72a, 72b, 72c, and 72d are user terminals that can be selected by the user 12, each corresponding to a user terminal that can be used in the real space and having unique model information. The model information of the user terminals 72a, 72b, 72c, and 72d may be the same or different. The user terminals 72a, 72b, 72c, and 72d have shapes (frames and display screens) based on their model information. An avatar 73 is an avatar corresponding to the user 12. That is, the user 12 can freely move the avatar 73 in the virtual space by moving and operating the HMD 10 and the controller 11.

Subsequently, the user state detector 113 of the HMD 10 transmits user state information including orientation information of the HMD 10 and operation information of the controller 11 to the VR content distribution apparatus 20 via the communicator 108 (S505). In response, the VR content distribution apparatus 20 generates VR content according to the user state information (S502), and distributes (transmits) the VR content to the HMD 10 (S504). Such transmission of user state information (orientation information and/or operation information) and distribution of VR content continue while the HMD 10 is logged into the system (S51).

After logging into the VR system, the user 12 uses the controller 11 (and/or the HMD 10) to select one user terminal from the plurality of user terminals placed in the virtual shop 71 (S506). FIG. 7B shows an example of a VR image for selecting a user terminal to use in virtual space. The user 12 selects the user terminal 72*d* via the avatar 73 in the VR image 70B in FIG. 7B. Note that when the avatar 73 touches a user terminal, the user terminal may be selected. Alternatively, in this case, a dialog asking whether or not to select the user terminal may be displayed, and the user terminal may be selected in a case where the answer is to select the user terminal.

Subsequently, the user 12 uses the controller 11 (and/or the HMD 10) to select a use mode (terminal use mode) in the virtual space for the user terminal 72*d*. FIG. 7C shows an example of an image for selecting the terminal use mode. In FIG. 7C, a selection area 74 is displayed superimposed on the VR image 70C. In this embodiment, the selectable terminal use modes include two types of modes, namely an "in-VR mode" and a "superimposed display mode".

The "in-VR mode" is a mode in which a user terminal is used by displaying a display screen of the user terminal realized by a virtual machine on the user terminal in the virtual space. In the "in-VR mode", the screen of the user terminal used by the user 12 in the virtual space can be seen (recognized) by other avatars as well.

The "superimposed display mode" is a mode in which the user terminal is used by displaying the display screen of the user terminal realized by the virtual machine on an image displayed superimposed on the virtual space (VR image). That is, the display screen of the user terminal realized by the virtual machine is displayed not in the virtual space but in a region separate from the virtual space. In the "superimposed display mode", the screen of the user terminal used by the user 12 in the virtual space cannot be seen (recognized) by other avatars.

In this example, the user 12 selects the "in-VR mode" as indicated by the mark 75 (S507). By selecting the "in-VR mode", the virtual space is configured such that the user 12 uses the selected user terminal in the virtual space.

After S506 and S507, the terminal selection detector 111 of the HMD 10 transmits terminal selection information to the VR content distribution apparatus 20 via the communicator 108 (S508). The terminal selection information includes information on the user terminal selected in S506, and in this example, information on the position of the user terminal 72*b* in the virtual shop 71 or identification information of the user terminal 72*b*, and information indicating the terminal use mode (="in-VR mode") selected in S507.

The model information generator 213 of the VR content distribution apparatus 20 specifies the user terminal according to the terminal selection information received from the HMD 20 via the communicator 205, and acquires the model information of the specified user terminal from the content database 206 (S509). The model information generator 213 outputs the model information to the content generator 212. Also, the model information generator 213 transmits the model information to the screen data generation apparatus 30 via the communicator 205 (S510). The model information transmitted to the screen data generation apparatus 30 corresponds to a request by the user 12 to use the user terminal having the model information (or a request to allocate a virtual machine of the model information).

Based on the model information acquired from the model information generator 213, the content generator 212 of the VR content distribution apparatus 20 acquires shape data of the user terminal associated with the model information, from the content database 206. Subsequently, the content generator 212 displays the shape of the user terminal indicated by the shape data in the VR image as a user terminal dedicated to the avatar 73 operated by the user 12 (S511). FIG. 7D shows an example of a VR image in which a user terminal dedicated to the avatar 73 operated by the user 12 is displayed. In the VR image 70D in FIG. 7D, the user terminal 76 is a user terminal dedicated to the avatar 73. The user terminal 76 corresponds to the user terminal 72*d* in the virtual shop 71, and has a shape according to the model information of the user terminal 72*d*. The user terminal 76 has a display screen (display screen 77), similarly to the user terminal 72*d*.

The virtual machine manager 311 of the screen data generation apparatus 30 prepares the virtual machine of the model information received from the VR content distribution apparatus 20 via the communicator 305 (the status is "not in use"). In a case where the RAM 303 stores a virtual machine with that model information (with the status "not in use"), the virtual machine is prepared. Otherwise, the virtual machine manager 311 prepares by creating the virtual machine with that model information. Then, the virtual machine manager 311 assigns the prepared virtual machine to the virtual machine for use by the user 12 (i.e., the avatar 73) (S512). The virtual machine manager 311 notifies the screen data acquirer 312 of the virtual machine identification information of the allocated virtual machine.

When the terminal operation detector 112 of the HMD 10 detects a terminal operation on the display screen 77 of the user terminal 76 displayed in the virtual shop 71 (S513), the information corresponding to the operation (terminal operation information) is transmitted to the VR content distribution apparatus 20 via the communicator 108 (S514). The terminal operation transferrer 214 of the VR content distribution apparatus 20 transfers the terminal operation information to the screen data generation apparatus 30 (S515). The operation is, for example, at least one of a tap operation (touch operation), a slide operation, and a scroll operation on the display screen 77 performed by the avatar 73 in the virtual space. For example, when the user 12 causes the avatar 73 to perform a tap operation on the display screen 77 with the controller 11 or the like, the tap operation position is the terminal operation information. The operation position may be expressed including a three-dimensional angle.

Upon receiving the terminal operation information via the communicator 305, the screen data acquirer 312 of the screen data generation apparatus 30 inputs the terminal operation information to the virtual machine allocated in S512, and acquires the screen data from the output of the virtual machine (S516). The acquired screen data is transmitted to the VR content distribution apparatus 20 via the communicator 305 (S517).

Figure 7E:
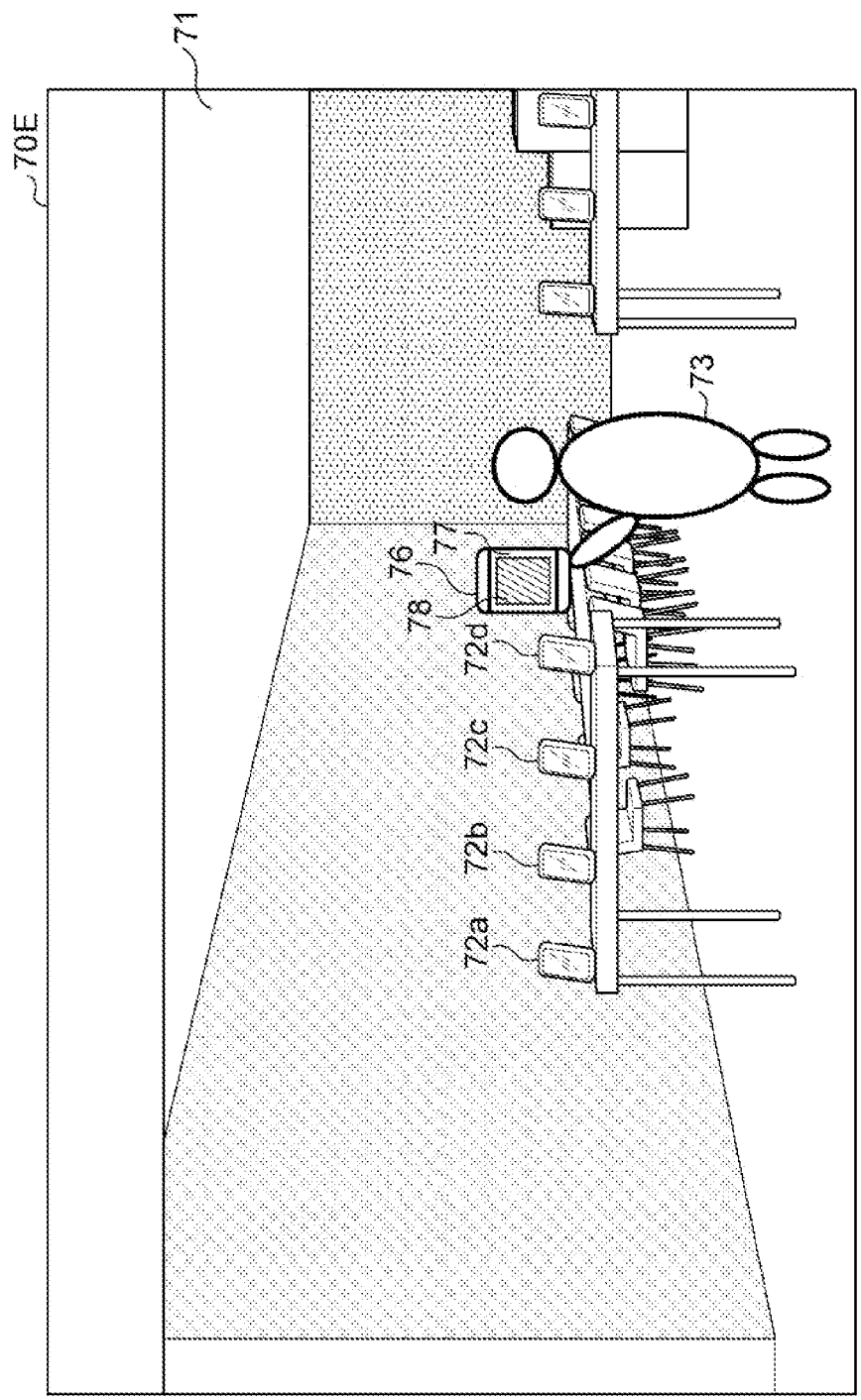
FIG. 7E shows an example of a VR image including a display screen in which screen data is embedded.

Upon receiving the screen data via the communicator 205, the content generator 212 of the VR content distribution apparatus 20 generates a VR image in which the screen data (i.e., an image based on the screen data) is embedded (incorporated) in the display screen 77 of the user terminal 76 in the virtual space (S518). FIG. 7E shows an example of a VR image including the display screen 77 in which screen data is embedded. In the VR image 70E in FIG. 7E, the display screen 77 displays screen data 78 (hatched portion)

displayed according to the operation performed the user 12 via the avatar 73. After that, until the HMD 10 detects (receives) the information indicating an end-of-use operation performed by the user 12, the display of the screen data corresponding to the terminal operation performed by the user 12 in the virtual space continues to be displayed on the display screen 77 (S52).

When the user state manager 211 of the VR content distribution apparatus 20 detects that the user state information received from the HMD 10 is information indicating an end-of-use operation of the user terminal in the virtual shop (S519), the user state manager 211 transmits an end instruction to the screen data generation apparatus 30 via the communicator 205 (S520). This ends the use of the user terminal 76 by the user 12 in the virtual space. The end-of-use operation is, for example, an operation for the avatar 73 to let go of the user terminal 76, or an operation for ending the "in-VR mode".

When the virtual machine manager 311 of the screen data generation apparatus 30 receives the end instruction from the VR content distribution apparatus 20 via the communicator 305, the virtual machine manager 311 deallocates the virtual machine allocated in S512 (S521). For example, the virtual machine manager 311 changes the status of the allocated virtual machine from "in use" to "not in use". Then, the virtual machine manager 311 references the RAM 303, and counts the number of virtual machines for which the model of communication apparatus to be realized is the same and for which the status is "not in use". Then, in a case where the number of the virtual machines is less than a predetermined number, the virtual machine manager 311 can initialize the allocated virtual machine (e.g., erase it once and recreate it). On the other hand, in a case where the number of virtual machines is the predetermined number or more, the virtual machine manager 311 can delete the allocated virtual machine.

Thereafter, the HMD 10 logs out of the VR system via the VR content distribution apparatus 20 (S522), whereby the VR content distribution apparatus 20 finishes providing the VR content to the HMD 10, and the processing of S51 ends. Flow of Processing (When a User Terminal is Used by Displaying an Image From the Screen Data Generation apparatus 30 in a Superimposed Manner on the Virtual Space)

Figure 6:
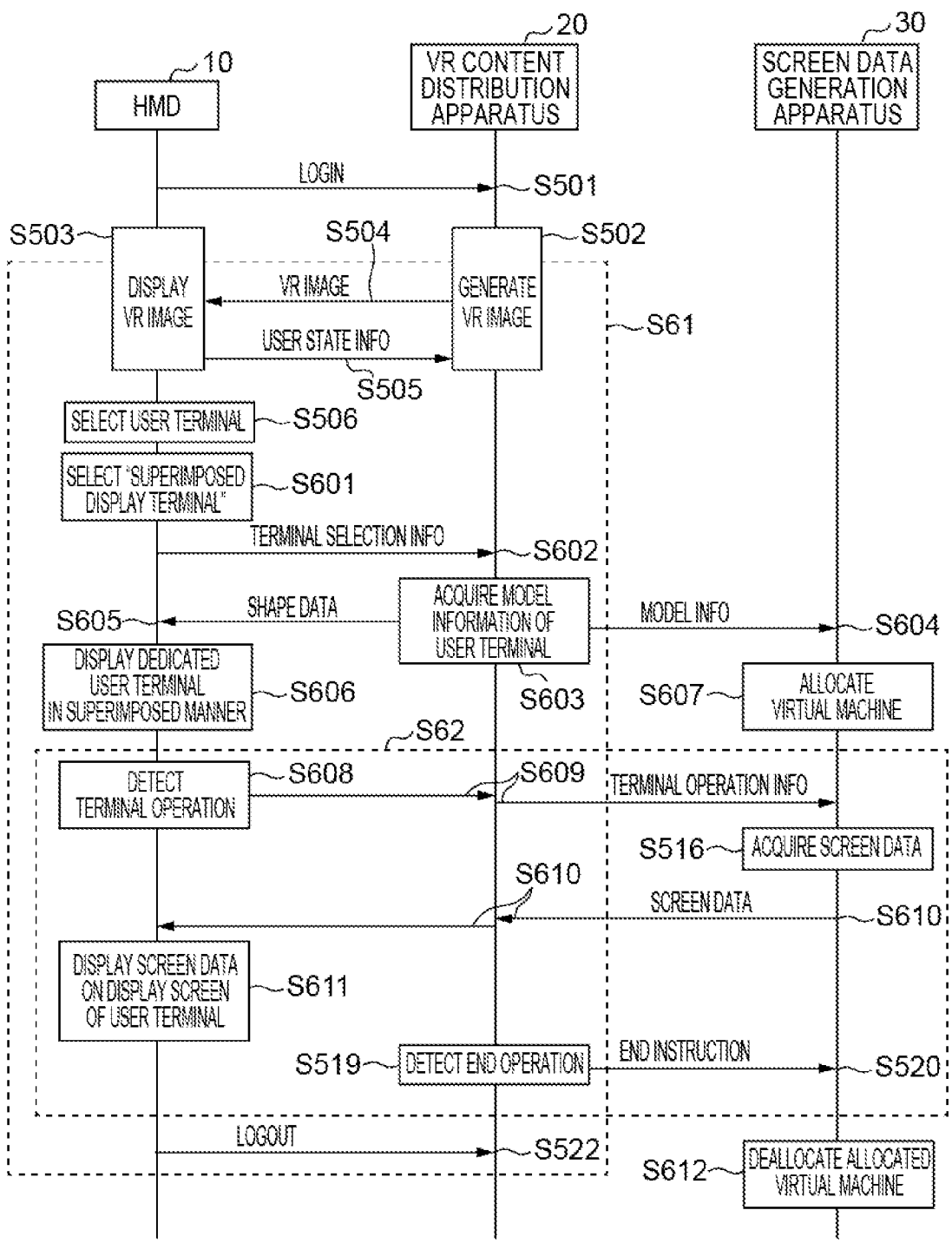
FIG. 6 shows another example of a communication sequence diagram for the HMD, the VR content distribution apparatus, and the screen generation apparatus.

The flow of processing when using a virtual user terminal (when operating a user terminal) displayed in a superimposed manner on the virtual space according to the present embodiment will be described with reference to FIG. 6. FIG. 5 shows another example of a communication sequence diagram for the HMD 10, the VR content distribution apparatus 20, and the screen data generation apparatus 30. Note that the same processing as in FIG. 5 is denoted by the same reference numerals, and description thereof is omitted.

After the user 12 logs into the VR system, transmission of user state information (orientation information and/or operation information) and distribution of VR images continue while the HMD 10 is logged into the system (S51).

The user 12 uses the controller 11 (and/or the HMD 10) to select a use mode (terminal use mode) in the virtual space for the user terminal 72d. In this example, the "superimposed display mode" is selected in the VR image 70C selection area 74 shown in FIG. 7C (S601).

After S506 and S601, the terminal selection detector 111 of the HMD 10 transmits terminal selection information to the VR content distribution apparatus 20 via the communicator 108 (S602). The terminal selection information includes information on the user terminal selected in S506, and in this example, includes information on the position of the user terminal 72b in the virtual shop 71 or identification information of the user terminal 72b, and information indicating the terminal use mode (="superimposed display mode") selected in S601.

The model information generator 213 of the VR content distribution apparatus 20 specifies the user terminal according to the terminal selection information received from the HMD 20 via the communicator 205, and acquires the model information of the user terminal from the content database 206 (S603). The model information generator 213 transmits the model information to the screen data generation apparatus 30 via the communicator 205 (S604). Also, the model information generator 213 acquires shape data of the user terminal associated with the model information, and transmits the shape data to the HMD 10 via the communicator 205 (S605).

The display controller 114 of the HMD 10 displays the shape data received from the model information generator 213 via the communicator 108 in a superimposed manner on the VR image (virtual space) displayed by the display 105 as a user terminal dedicated to the user 12 (S606). FIG. 7F shows an example of a VR image in which a user-dedicated user terminal is displayed in a superimposed manner. In the VR image 70F in FIG. 7F, the user terminal 79 is a user terminal dedicated to the user 12, which is displayed in a superimposed manner on the VR image 70F. The user terminal 79 corresponds to the user terminal 72d in the virtual shop 71 and has a shape according to the model information of the user terminal 72d. The user terminal 76 has a display screen (display screen 80), similarly to the user terminal 72d. Note that the size of the user terminal 79 may be adjustable as appropriate, and may be displayed in a size larger than usual for visibility.

The virtual machine manager 311 of the screen data generation apparatus 30 prepares a virtual machine corresponding to the model information received from the VR content distribution apparatus 20 via the communicator 305 (the status is "not in use"). In a case where the RAM 303 stores a virtual machine with that model information (with the status "not in use"), the virtual machine is prepared. Otherwise, the virtual machine manager 311 prepares by creating the virtual machine with that model information. Then, the virtual machine manager 311 allocates the prepared virtual machine to the virtual machine for use by the user 12 (S607). The virtual machine manager 311 notifies the screen data acquirer 312 of the virtual machine identification information of the allocated virtual machine.

When the terminal operation detector 112 of the HMD 10 detects a terminal operation on the display screen 80 of the user terminal 79 displayed in a superimposed manner on the virtual shop 71 (S608), information corresponding to the operation (terminal operation information) is transmitted to the VR content distribution apparatus 20 via the communicator 108, and is transferred to the screen data generation apparatus 30 by the VR content distribution apparatus 20 (S609). The operation is, for example, at least one of a tap operation (touch operation), a slide operation, and a scroll operation on the display screen 80. For example, when the user 12 performs a tap operation on the display screen 80 with the controller 11 or the like, the position of the tap operation is the terminal operation information.

Upon receiving the terminal operation information via the communicator 305, the screen data acquirer 312 of the screen data generation apparatus 30 inputs the terminal operation information to the virtual machine allocated in S512, and acquires the screen data from the output of the virtual machine (S516). The acquired screen data is transmitted to the VR content distribution apparatus 20 via the communicator 305, and is transferred to the HMD 10 by the VR content distribution apparatus 20 (S610).

Figure 7G:
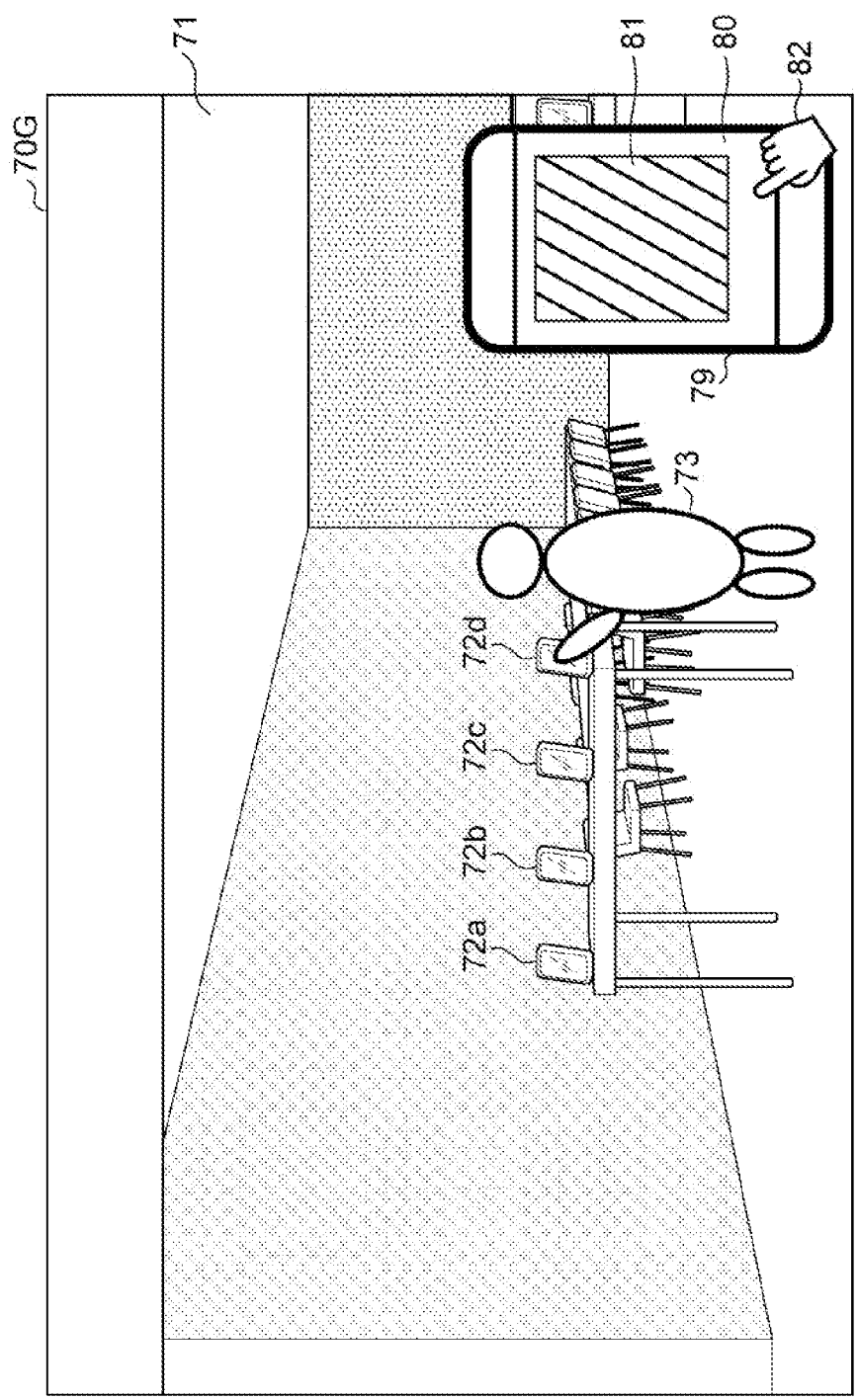
FIG. 7G shows an example of a VR image including a display screen displaying screen data.

Upon receiving the screen data via the communicator 108, the display controller 114 of the HMD 10 displays (displays in a superimposed manner) the screen data (i.e., an image based on the screen data) on the display screen 80 of the user terminal 79 in the virtual space (S611). FIG. 7G shows an example of a VR image including the display screen 80 on which the screen data is displayed. In the VR image 70G in FIG. 7G, the display screen 80 displays screen data 81 (hatched portion) displayed according to the operation performed by the user 12.

Note that the terminal operation on the display screen 80 may be an operation performed by the avatar 73 or an operation performed by a cursor 82 set by the display controller 114. The cursor 82 may be controlled by the controller 11, for example.

After that, when the user state manager 211 of the VR content distribution apparatus 20 detects that the user state information received from the HMD 10 is information indicating an end-of-use operation of the user terminal in the virtual shop (S519), the user state manager 211 transmits an end instruction to the screen data generation apparatus 30 via the communicator 205 (S520). This ends the use of the user terminal 79 displayed in a superimposed manner on the virtual space by the user 12. The end-of-use operation is, for example, an operation for ending the "superimposed display mode".

When the virtual machine manager 311 of the screen data generation apparatus 30 receives the end instruction from the VR content distribution apparatus 20 via the communicator 305, the virtual machine manager 311 releases the virtual machine allocated in S607 (S612). For example, the virtual machine manager 311 changes the status of the allocated virtual machine from "in use" to "not in use". Then, the virtual machine manager 311 references the RAM 303 and counts the number of virtual machines for which the model of communication apparatus to be realized is the same and for which the status is "not in use". Then, in a case where the number of the virtual machines is less than the predetermined number, the virtual machine manager 311 can initialize the allocated virtual machine (e.g., erase it once and reconfigure it). On the other hand, in a case where the number of virtual machines is the predetermined number or more, the virtual machine manager 311 can delete the allocated virtual machine.

Thereafter, the HMD 10 logs out of the VR system provided by the VR content distribution apparatus 20 (S522), whereby the VR content distribution apparatus 20 finishes providing the VR content to the HMD 10, and the processing of S61 ends.

In this manner, according to the above-described embodiment, the user can, in a simulated manner, use a user terminal that can be used in real space, in a virtual shop realized in a VR image (i.e., a virtual space) displayed on an HMD worn by the user. As a result, the user can, in the virtual space, check how it feels to use the user terminal that can be used in real space, without going to an actual store in real space.

Also, it is possible to, in a timely manner, create (and delete) a virtual machine for providing screen data of a user terminal in the virtual space. As a result, even if only a limited number of user terminals can be disposed in the virtual shop, the user can select and use the user terminal he/she wants to use without worrying about the number.

Note that although specific embodiments have been described above, the embodiments are merely examples and are not intended to limit the scope of the present disclosure. The devices and methods described in the present specification can be embodied in modes other than those described above. Also, omissions, substitutions, and modifications may be made as appropriate to the above-described embodiments without departing from the scope of the present disclosure. Such omissions, substitutions, and modifications are included in the scope of the claims and their equivalents, and fall within the technical scope of the present disclosure.

Embodiments of the Present Disclosure

The present disclosure includes the following embodiments.

[1] A virtual space system including one or more processors, in which at least one of the one or more processors executes: first detection processing for detecting a communication apparatus object selected from a plurality of communication apparatus objects in a virtual space; first display processing for displaying, in a predetermined display area, a display screen of a communication apparatus of the same model as that represented by the selected communication apparatus object, the communication apparatus being realized by a virtual machine; second detection processing for detecting an operation on the display screen in the display area; acquisition processing for acquiring a display screen, which is to be displayed according to the operation, of the communication apparatus realized by the virtual machine, by inputting information indicating the operation to the virtual machine; and second display processing for displaying the display screen to be displayed according to the operation in the display area.

[2] The virtual space system according to [1], in which the first display processing includes displaying a new communication apparatus object other than the plurality of communication apparatus objects, and displaying the display screen inside of the new communication apparatus object.

[3] The virtual space system according to [2], in which a shape of the new communication apparatus object is the same as that of the selected communication apparatus object.

[4] The virtual space system according to [2] or [3], in which the second detection processing includes detecting at least one of a tap operation, a slide operation, and a scroll operation on the display screen of the new communication apparatus object as the operation.

[5] The virtual space system according to [1], in which the first display processing includes displaying an image imitating a frame of a communication apparatus in a superimposed manner on an image representing the virtual space, and displaying the display screen inside the frame.

[6] The virtual space system according to [5], in which the image imitating a frame of a communication apparatus imitates a frame of the selected communication apparatus object.

[7] The virtual space system according to [5] or [6], in which the second detection processing includes detecting at least one of a tap operation, a slide operation, and a scroll operation on the display screen in the image imitating a frame of a communication apparatus as the operation.

[8] The virtual space system according to [1], in which the first display processing includes displaying the display screen inside of any one of the plurality of communication apparatus objects.

[9] The virtual space system according to [1], in which at least one of the one or more processors executes: creation processing for creating a plurality of virtual machines for virtually realizing respective communication apparatuses of the same models as those of the respective plurality of communication apparatus objects; allocation processing for allocating one of the plurality of virtual machines to the selected communication apparatus object based on the model of the selected communication apparatus; and deallocation processing for deallocating the virtual machine allocated to the selected communication apparatus object in response to an instruction to end use of the selected communication apparatus object.

[10] The virtual space system according to [9], in which at least one of the one or more processors executes management processing for managing a virtual machine allocated to the selected communication apparatus object among the plurality of virtual machines as being in use, and managing another virtual machine as being not in use.

[11] The virtual space system according to [10], in which the creation processing includes further creating the virtual machine in a case where the number of virtual machines for which the model of communication apparatus to be realized is the same and that are managed as being not in use is a predetermined number or less among the plurality of virtual machines.

[12] The virtual space system according to or [11], in which at least one of the one or more processors further executes deletion processing for deleting at least one virtual machine in a case where the number of virtual machines for which the model of communication apparatus to be realized is the same and that are managed as being not in use is a predetermined number or more among the plurality of virtual machines.

[13] The virtual space system according to any one of to [12], in which at least one of the one or more processors further executes initialization processing for initializing the virtual machine deallocated through the deallocation processing.

[14] A virtual space control method including: detecting a communication apparatus object selected from a plurality of communication apparatus objects in a virtual space; a displaying, in a predetermined display area, a display screen of a communication apparatus of the same model as that represented by the selected communication apparatus object, the communication apparatus being realized by a virtual machine; detecting an operation on the display screen in the display area; acquiring a display screen, which is to be displayed according to the operation, of the communication apparatus realized by the virtual machine, by inputting information indicating the operation to the virtual machine; and displaying the display screen to be displayed according to the operation in the display area.

REFERENCE NUMERALS AND SYMBOLS

10: Head mounted display (HMD)
11: Controller
12: User
20: VR content distribution apparatus
30: Screen data generation apparatus
101: CPU
102: ROM
103: RAM
104: HDD
105: Display
106: Motion sensor
107: Controller IF
108: Communicator
111: Terminal selection detector
112: Terminal operation detector
113: User state detector
114: Display controller
201: CPU
202: ROM
203: RAM
204: HDD
205: Communicator
206: Content database
211: User state manager
212: Content generator
213: Model information generator
214: Terminal operation transferrer
301: CPU
302: ROM
303: RAM
304: HDD
305: Communicator
311: Virtual machine manager
312: Image data acquirer
321: Hypervisor
331, 332, 333: Virtual machine (VM)
341, 342, 343: Guest OS
351, 352, 353: Application

The invention claimed is:

1. A virtual space system comprising
one or more processors,
wherein at least one of the one or more processors executes:
first detection processing for detecting a communication apparatus object selected from a plurality of communication apparatus objects in a virtual space;
first display processing for displaying, in a predetermined display area, a display screen of a communication apparatus of the same model as that represented by the selected communication apparatus object, the communication apparatus being realized by a virtual machine;
second detection processing for detecting an operation on the display screen in the display area;
acquisition processing for acquiring the display screen, which is to be displayed according to the operation, of the communication apparatus realized by the virtual machine, by inputting information indicating the operation to the virtual machine; and
second display processing for displaying the display screen to be displayed according to the operation in the display area.

2. The virtual space system according to claim 1, wherein the first display processing includes displaying a new communication apparatus object other than the plurality of communication apparatus objects, and displaying the display screen inside of the new communication apparatus object.

3. The virtual space system according to claim 2, wherein a shape of the new communication apparatus object is the same as that of the selected communication apparatus object.

4. The virtual space system according to claim 2, wherein the second detection processing includes detecting at least one of a tap operation, a slide operation, and a scroll operation on the display screen of the new communication apparatus object as the operation.

5. The virtual space system according to claim 1, wherein the first display processing includes displaying an image imitating a frame of a communication apparatus in a superimposed manner on an image representing the virtual space, and displaying the display screen inside the frame.

6. The virtual space system according to claim 5, wherein the image imitating a frame of a communication apparatus imitates a frame of the selected communication apparatus object.

7. The virtual space system according to claim 5, wherein the second detection processing includes detecting at least one of a tap operation, a slide operation, and a scroll operation on the display screen in the image imitating a frame of a communication apparatus as the operation.

8. The virtual space system according to claim 1, wherein the first display processing includes displaying the display screen inside of any one of the plurality of communication apparatus objects.

9. The virtual space system according to claim 1,
wherein at least one of the one or more processors executes:
creation processing for creating a plurality of virtual machines for virtually realizing respective communication apparatuses of the same models as those of the respective plurality of communication apparatus objects;
allocation processing for allocating one of the plurality of virtual machines to the selected communication apparatus object based on the model of the selected communication apparatus; and
deallocation processing for deallocating the virtual machine allocated to the selected communication apparatus object in response to an instruction to end use of the selected communication apparatus object.

10. The virtual space system according to claim 9,
wherein at least one of the one or more processors executes
management processing for managing a virtual machine allocated to the selected communication apparatus object among the plurality of virtual machines as being in use, and managing another virtual machine as being not in use.

11. The virtual space system according to claim 10, wherein the creation processing includes further creating the virtual machine in a case where the number of virtual machines for which the model of communication apparatus to be realized is the same and that are managed as being not in use is a predetermined number or less among the plurality of virtual machines.

12. The virtual space system according to claim 10,
wherein at least one of the one or more processors further executes
deletion processing for deleting at least one virtual machine in a case where the number of virtual machines for which the model of communication apparatus to be realized is the same and that are managed as being not in use is a predetermined number or more among the plurality of virtual machines.

13. The virtual space system according to claim 10,
wherein at least one of the one or more processors further executes
initialization processing for initializing the virtual machine deallocated through the deallocation processing among the plurality of virtual machines.

14. A virtual space control method comprising:
detecting a communication apparatus object selected from a plurality of communication apparatus objects in a virtual space;
displaying, in a predetermined display area, a display screen of a communication apparatus of the same model as that represented by the selected communication apparatus object, the communication apparatus being realized by a virtual machine;
detecting an operation on the display screen in the display area;
acquiring the display screen, which is to be displayed according to the operation, of the communication apparatus realized by the virtual machine, by inputting information indicating the operation to the virtual machine; and
displaying the display screen to be displayed according to the operation in the display area.

* * * * *